United States Patent [19]
Miyata

[11] Patent Number: 6,142,898
[45] Date of Patent: Nov. 7, 2000

[54] NON-STAGE TRANSMISSION FOR VEHICLES AND LAWN MOWING TRACTOR USING SAME

[75] Inventor: Hirofumi Miyata, Kobe, Japan

[73] Assignee: Bando Chemical Industries, Ltd., Kobe, Japan

[21] Appl. No.: 09/117,736

[22] PCT Filed: Nov. 20, 1997

[86] PCT No.: PCT/JP97/04244

§ 371 Date: Aug. 5, 1998

§ 102(e) Date: Aug. 5, 1998

[87] PCT Pub. No.: WO98/25052

PCT Pub. Date: Jun. 11, 1998

[30] Foreign Application Priority Data

Dec. 6, 1996 [JP] Japan .................................. 8-327382

[51] Int. Cl.$^7$ ........................... F16H 59/00; F16H 37/02; F16H 57/02

[52] U.S. Cl. .................. 474/29; 474/21; 474/135; 475/210; 475/211; 74/606 R

[58] Field of Search ................... 475/210, 213, 475/212, 211; 474/29, 21, 135, 30, 101, 69, 72; 56/11.8, 11.9, 11.1, 11.4, 11.6, 16.7; 74/600 R

[56] References Cited

U.S. PATENT DOCUMENTS

| | | |
|---|---|---|
| 3,538,789 | 11/1970 | Quick et al. ...................... 474/29 X |
| 3,850,050 | 11/1974 | Lemmens ........................... 475/211 X |
| 4,671,134 | 6/1987 | Luo ....................................... 475/211 |
| 4,838,834 | 6/1989 | Miyata ................................ 474/28 X |
| 5,167,591 | 12/1992 | Cowan ................................. 475/211 |
| 5,848,949 | 12/1998 | Miyata et al. ...................... 474/29 X |

FOREIGN PATENT DOCUMENTS

| | | |
|---|---|---|
| 59-164448 | 9/1984 | Japan . |
| 60-69361 | 5/1985 | Japan . |
| 61-62653 | 3/1986 | Japan . |
| 62-118159 | 5/1987 | Japan . |
| 62-177338 | 8/1987 | Japan . |
| 2-80843 | 3/1990 | Japan . |
| 3-9152 | 1/1991 | Japan . |
| 3-92652 | 4/1991 | Japan . |
| 4-69441 | 3/1992 | Japan . |
| 7-109235 | 11/1995 | Japan . |
| 9-317844 | 12/1997 | Japan . |
| 63-186061 | 8/1998 | Japan . |

Primary Examiner—David A. Bucci
Assistant Examiner—Marcus Charles
Attorney, Agent, or Firm—Nixon Peabody LLP; Thomas W. Cole

[57] ABSTRACT

In a continuously variable speed transmission T in which one of two power transmission paths connecting to a planetary gear mechanism 12 is formed of a belt variable speed mechanism 9, the other power transmission path is formed of a belt power transmission mechanism 6 so as to decrease the number of casings, increase the maintainabilities of the belt speed change mechanism 9 and the power transmission mechanism constituting the other power transmission path and further accelerate the application of the continuously variable speed transmission T to vehicles. Further, both variable speed pulleys 10, 10 and a variable speed belt 11 in the belt variable speed mechanism 9 are positioned above a casing 2 for the planetary gear mechanism 12, and both pulleys 7, 7 and a power transmission belt 8 in the belt power transmission mechanism 6 are positioned below the casing 2.

22 Claims, 6 Drawing Sheets

NON-STAGE TRANSMISSION FOR VEHICLES AND LAWN MOWING TRACTOR USING SAME

TECHNICAL FIELD

This invention relates to a continuously variable speed transmission for vehicle provided with a differential gear mechanism and a belt variable speed mechanism and a mowing tractor using the continuously variable speed transmission, and particularly relates to a technique of increasing the ability of a continuously variable speed transmission to be laid out when the transmission is mounted on a vehicle.

BACKGROUND ART

As an example of a continuous variable speed transmission used in a manner to be mounted on an agricultural vehicle or the like, there is well known a belt-type transmission comprising a belt variable speed mechanism. In the belt variable speed mechanism, an input shaft and an output shaft, placed in parallel with each other, are each provided with a variable speed pulley composed of (a) a fixed sheave mounted on the shaft for unitary rotation and for no movement along the shaft and (b) a movable sheave which is opposed to the fixed sheave so as to form a V-shaped belt groove therebetween and is supported to the shaft for unitary rotation and for movement along the shaft, and a variable speed belt is wound between the belt grooves formed in both the variable speed pulleys on the input and output shafts. The movable sheaves of the variable speed pulleys are moved along the input and output shafts, respectively, so that respective effective radiuses of the variable speed pulleys with respect to the variable speed belt are changed. As a result, a speed ratio between the input and output shafts is changed.

Japanese Patent Application Laid-Open Gazette No. 62-118159 proposes a continuously variable speed transmission in which a belt variable speed mechanism having the above structure and a gear mechanism are arranged in parallel between input and output shafts and a planetary gear mechanism as a differential gear mechanism is disposed among the belt variable speed mechanism, the gear mechanism and the output shaft.

In the proposed continuously variable speed transmission, the planetary gear mechanism has three gear elements, the first gear element is connected to the gear mechanism thereby constituting a power transmission path, the second gear element is connected to the belt variable speed mechanism thereby constituting another power transmission path, and the third gear element is connected to the output shaft. More specifically, first and second rotation shafts are placed coaxially with the output shaft, the gear mechanism is provided between the first rotation shaft and the input shaft, and the first gear element is mounted on the first rotation shaft. Further, the belt variable speed mechanism is provided between the second rotation shaft and the input shaft, and the second gear element is mounted on the second rotation shaft. By changing the rotational speed of the gear element connected to the belt variable speed mechanism while rotating the gear element connected to the gear mechanism at a constant rate, the rotational speed of the output shaft is changed or the rotational direction of the output shaft is changed.

In the continuously variable speed transmission having the differential gear mechanism such as the above-mentioned planetary gear mechanism, when the output shaft is rotated from rest, the power transmission path is divided into a driving power transmission path and an inverse power transmission path between the gear mechanism and the belt variable speed mechanism. In other words, when one path becomes a driving power transmission path, the other becomes an inverse power transmission path. Which becomes the driving power transmission path or the inverse power transmission path depends upon the difference in circumferential speeds between the gear element connected to the gear mechanism and the gear element connected to the belt variable speed mechanism. The path including the gear element having a larger circumferential speed becomes the driving power transmission path. Since driving power and inverse power arise as power, power obtained by subtracting the inverse power from the driving power is output power.

However, in the continuously variable speed transmission in which the belt variable speed mechanism and the gear mechanism are parallel-arranged between the input and output shafts as in the above-proposed example, when the distance between both the shafts is changed, this requires a design change such that the size of each gear of the gear mechanism and the number of gears thereof are changed, which increases the cost.

Further, in order to lubricate, with a lubricant, parts among elements of the differential gear mechanism and mating points of the gear mechanism, casings for keeping the lubricant are necessary. Finding spaces for disposing the casings prevents the continuously variable speed transmission from being compacted.

To cope with these problems, it can be considered that a belt power transmission mechanism is used instead of the gear mechanism. More specifically, the input shaft and the first rotation shaft are each provided with a pulley for unitary rotation, and a power transmission belt is wound between both the pulleys. According to this arrangement, since both the two power transmission paths each include the belt, a change in the center distance requires only a belt change. Further, since there is no need for lubrication as in the case of the gear mechanism, this eliminates the need for casings for lubrication.

Meanwhile, in the case of using the belt power transmission mechanism, maintainability is important unlike the case of using the gear mechanism. That is to say, it is desirable to make maintenance work such a belt inspection and a belt change readily feasible. For example, the presence of a casing containing the differential gear mechanism may impair maintainability.

Generally, in the drive train of a vehicle, a reduction gear mechanism is incorporated immediately forward of a drive shaft connected to a drive wheel. When the above continuously variable speed transmission is placed at a part on the drive shaft side, sufficient consideration must be given to the positional relationship between the continuously variable speed transmission and the reduction gear mechanism.

Accordingly, in a continuously variable speed transmission of the present invention in which one of two power transmission paths connecting to a differential gear mechanism such as a planetary gear mechanism is formed of a belt variable speed mechanism and the other power transmission path is formed of a belt power transmission mechanism instead of a gear mechanism, an object of the present invention is to improve the positional relationship between the belt power transmission mechanism and the casing of the differential gear mechanism or the reduction gear mechanism of the vehicle and the positional relationship between the belt variable speed mechanism and the casing of the differential gear mechanism or the reduction gear mechanism of the vehicle thereby obtaining good maintainabilities of both the belt power transmission mechanism and the belt variable speed mechanism and further accelerating the application of the continuously variable speed transmission to vehicles.

DISCLOSURE OF INVENTION

To attain the above object, in the present invention, the belt power transmission mechanism and the belt variable speed mechanism are placed on both axial sides of the casing containing the differential gear mechanism, respectively, so as to avoid the casing to impair the maintainabilities of the belt power transmission mechanism and the belt variable speed mechanism. Further, in terms of the relationships of the belt power transmission mechanism and the belt variable speed mechanism with the reduction gear mechanism of the vehicle, the reduction gear mechanism is previously incorporated into the casing.

More specifically, an aspect of claim 1 of the present invention premises a continuously variable speed transmission comprising: an input shaft drivingly connected to a vehicle-mounted engine; a first rotation shaft placed in parallel with the input shaft; a power transmission mechanism, provided between the input shaft and the first rotation shaft, for transmitting power between the input shaft and the first rotation shaft at a constant ratio; a second rotation shaft placed coaxially with the first rotation shaft; a belt variable speed mechanism, including two variable speed pulleys with a variable pulley diameter respectively provided on the second rotation shaft and the input shaft for unitary rotation and a variable speed belt wound between both the variable speed pulleys, for transmitting power between the input shaft and the second rotation shaft at a variable ratio; a differential gear mechanism which includes a first gear element connected to the first rotation shaft, a second gear element connected to the second rotation shaft and a third gear element changing its rotational direction and rotational speed with the change in the circumferential speed difference between the first and second gear elements and is enclosed in a casing; and an output shaft coaxially placed with the first and second rotation shafts and drivingly connected to the third gear element.

The power transmission mechanism is formed of a belt power transmission mechanism including two pulleys respectively provided on the input shaft and the first rotation shaft for unitary rotation and a power transmission belt wound around both the pulleys. Further, both the pulleys and the power transmission belt of the belt power transmission mechanism are placed in a plane parallel with a plane in which both the variable speed pulleys and the variable speed belt of the belt variable speed mechanism are provided, and the casing is placed between the belt power transmission mechanism and the belt variable speed mechanism.

According to the above arrangement, when the input shaft of the continuously variable speed transmission is driven by the vehicle-mounted engine, power transmission between the input shaft and the first gear element of the differential gear mechanism is made via the power transmission mechanism, and power transmission between the input shaft and the second gear element of the differential gear mechanism is made via the belt variable speed mechanism. The first gear element rotates at a constant rate, whereas the second gear element changes its circumferential speed through the belt variable speed mechanism. In response to a difference in the circumference speeds between the first and second gear elements, the third gear element of the differential gear mechanism changes its rotational direction and rotational speed. As a result, even when the input shaft rotates in one direction at a constant rate, the output shaft changes its rotational direction and rotational speed.

In the above arrangement, since the power transmission mechanism is a belt power transmission mechanism including two pulleys and a power transmission belt, this eliminates the need for the casing as in the case of the conventional gear mechanism. That is to say, the continuously variable speed transmission requires only the casing for containing the differential gear mechanism. Accordingly, the continuously variable speed transmission can be compacted by a space for the unnecessary casing for the power transmission mechanism.

Further, both the pulleys and the power transmission belt in the belt power transmission mechanism are arranged on one axial side of the casing, both the variable speed pulleys and the variable speed belt in the belt variable speed mechanism are arranged on the other axial side of the casing, and both the belts are located outside of the casing. Accordingly, the presence of the casing does not interfere with the maintenance of the belts thereby increasing maintainability.

In the present invention, a reduction gear mechanism connected to each of drive wheels of a vehicle through a drive shaft may be disposed in the casing and the reduction gear mechanism may be previously drivingly connected to the output shaft.

According to the above arrangement, for example, in the case where the continuously variable speed transmission is placed close to the reduction gear mechanism on the drive wheel side, the reduction gear mechanism can be placed in the casing for the differential gear mechanism in the continuously variable speed transmission and can be previously drivingly connected to the output shaft. Thereby, it can be avoided that the continuously variable speed transmission interferes with the reduction gear mechanism to decrease the maintainabilities of both the belt power transmission mechanism and the belt variable speed mechanism.

Further, since the reduction gear mechanism is contained in the casing so as to be closed to the outside, this eliminates the need for a casing designed specifically for the reduction gear mechanism. Accordingly, the reduction gear mechanism itself can be compacted by a space for the eliminated casing, and the casing can be prevented from being extremely upsized due to the accommodation of the reduction gear mechanism.

Furthermore, since the reduction gear mechanism is previously drivingly connected to the output shaft, a simple mounting work of the continuously variable speed transmission on a vehicle body doubles as an incorporation of the reduction gear mechanism into the vehicle body. This facilitates the assembly work to the vehicle body and makes it efficient.

In the present invention, each of the drive shafts may be designed so as to be previously drivingly connected at one end thereof to the reduction gear mechanism and to be rotatably supported to the casing. According to this arrangement, at the time when the continuously variable speed transmission into which the reduction gear mechanism for the vehicle is integrated is mounted on the vehicle body, the drive shafts connected to the corresponding drive wheels are previously drivingly connected to the reduction gear mechanism. In other words, the reduction gear mechanism and the drive train are previously connected to the continuously variable speed transmission and therefore, a part of the drive train of the vehicle located on the drive wheel side is integrated into a unit as a whole. This further facilitates the assembly work to the vehicle body and makes it more efficient.

In the present invention, arrangement may be made such that the drive shaft is placed to extend in a direction approximately orthogonal to the input and output shafts, an auxiliary shaft disposed to extend in parallel with the drive shaft is drivingly connected to the output shaft and the reduction gear mechanism is provided between the auxiliary shaft and the drive shaft. Under this arrangement, the output shaft of the continuously variable speed transmission and the drive shaft are connected to each other through the reduction gear mechanism and the auxiliary shaft drivingly connected to the output shaft, and the drive shaft extends in the direction approximately orthogonal to the input and output shafts of the continuously variable speed transmission. Therefore, the drive shaft can be prevented from interfering with both the pulleys and the power transmission belt in the belt power transmission mechanism, placed in a plane orthogonal to the input and output shafts, and with both the variable speed pulleys and the variable speed belt in the belt variable speed mechanism, similarly, placed in a plane orthogonal to the input and output shafts. This avoids decreases in the maintainabilities of the belt power transmission mechanism and the belt variable speed mechanism due to the presence of the drive shaft. Further, since the drive shaft and the auxiliary shaft are parallel with each other, the reduction gear mechanism can readily be provided between both the shafts.

The present invention may be composed such that a mowing tractor is provided with the continuously variable speed transmission having each of the above-mentioned arrangements and a rotatively driving force of an engine is transmitted to each of the drive wheels of the tractor through the continuously variable speed transmission. According to this arrangement, since a rotatively driving force of the engine of the mowing tractor is transmitted to each of the drive wheels through the continuously variable speed transmission, this provides a vehicle suitable for the mounting of the continuously variable speed transmission.

Further, in the present invention, the mowing tractor having the above arrangement may be provided with a belt power transmission mechanism for transmitting the rotatively driving force of the engine to the continuously variable speed transmission. According to this arrangement, in the case where the distance between the engine and the continuously variable speed transmission must be changed, only a change in the length of the belt of the belt power transmission mechanism is required, which enables a proper power transmission between the engine and the continuously variable speed transmission. Thereby, the response to changes in the distance between the engine and the continuously variable speed transmission can be made readily and correctly as compared with the case of using, for example, the gear mechanism.

Furthermore, in the above mowing tractor, the continuously variable speed transmission can be placed such that both the variable speed pulleys and the variable speed belt in the belt variable speed mechanism are positioned above the casing and both the pulleys and the power transmission belt in the belt power transmission mechanism are positioned below the casing. The belt variable speed mechanism has a larger number of elements and movable parts as compared with the belt power transmission mechanism, and therefore its frequency of maintenance such as a checking work and a belt change is higher. According to this arrangement, since both the variable speed pulleys and the variable speed belt in the belt variable speed mechanism are positioned above the casing, maintenance can readily be made as compared with the case as positioned below the casing. This increases maintenance efficiency of the continuously variable speed transmission in the mowing tractor.

The above mowing tractor of the present invention can be arranged such that an annular space open toward the casing is formed between the first rotation shaft and a boss of the pulley on the first rotation shaft, the casing is provided with a cylindrical part which protrudes around a through hole for the insertion of the first rotation shaft and enters the annular space, a bearing for rotatably supporting the pulley to the cylindrical part is interposed between the cylindrical part and the boss of the pulley, and the first rotation shaft is rotatably supported to the cylindrical part through the boss of the pulley and the bearing.

According to this arrangement, since the cylindrical part of the casing for rotatably supporting the first rotation shaft protrudes toward the pulley fixed on the first rotation shaft, this avoids the interference with the differential gear mechanism as caused in the case where the cylindrical part protrudes inside of the casing. Further, since the annular space open toward the casing is formed between the both of the pulley and the first rotation shaft and the cylindrical part protrudes with entering the annular space, even when the cylindrical part protrudes outside of the casing, the pulley can be kept in a high position, which prevents the interference with the running of the mowing tractor. Accordingly, the first rotation shaft can be supported to the cylindrical part of the casing without increasing the shaft length and the vertical dimension of the continuously variable speed transmission can be compacted by the shaft length not to be increased.

The above mowing tractor of the present invention can be arranged such that the continuously variable speed transmission is placed so that the input and output shafts are aligned in a lateral direction of the tractor body. According to this arrangement, since both the variable speed pulleys and both the pulleys of the continuously variable speed transmission are aligned in the lateral direction of the tractor body, the belt wound between both the variable speed pulleys and the belt wound between both the pulleys can be placed so as to extend in the lateral direction of the tractor body. Thereby, the dimension of the continuously variable speed transmission in the front-and-rear direction of the tractor body can be made smaller than that in the lateral direction of the tractor body. Accordingly, even on the mowing tractor having a small mounting space in the front-and-rear direction of the tractor body, the continuously variable speed transmission can be efficiently mounted.

In the above mowing tractor, the input and output shafts of the continuously variable speed transmission can be placed closer to the middle in the front-and-rear direction of the tractor body than the drive shaft. According to this arrangement, the belt power transmission mechanism protruding downward from the casing can be moved closer to the middle of the front-and-rear direction of the tractor body than the drive shaft. This avoids the overhang angle of the mowing tractor from decreasing due to the presence of the belt power transmission mechanism.

The above mowing tractor of the present invention can be arranged such that the continuously variable speed transmission is placed so that the input and output shafts are aligned in the front-and-rear direction of the tractor body.

According to this arrangement, since both the variable speed pulleys and both the pulleys of the continuously variable speed transmission are aligned in the front-and-rear direction of the tractor body, the belt wound between both the variable speed pulleys and the belt wound between both the pulleys can be placed so as to extend in the front-and-rear direction of the tractor body. In contrast to the aforementioned case, the dimension of the continuously variable speed transmission in the lateral direction of the tractor body can be made smaller than that in the front-and-rear direction of the tractor body. Accordingly, even on the mowing tractor having a small mounting space in the lateral direction of the tractor body, the continuously variable speed transmission can be efficiently mounted.

BEST MODE FOR CARRYING OUT THE INVENTION

With reference to the accompanying drawings, the best mode for carrying out the present invention will be discussed as an embodiment.

Figure 2:
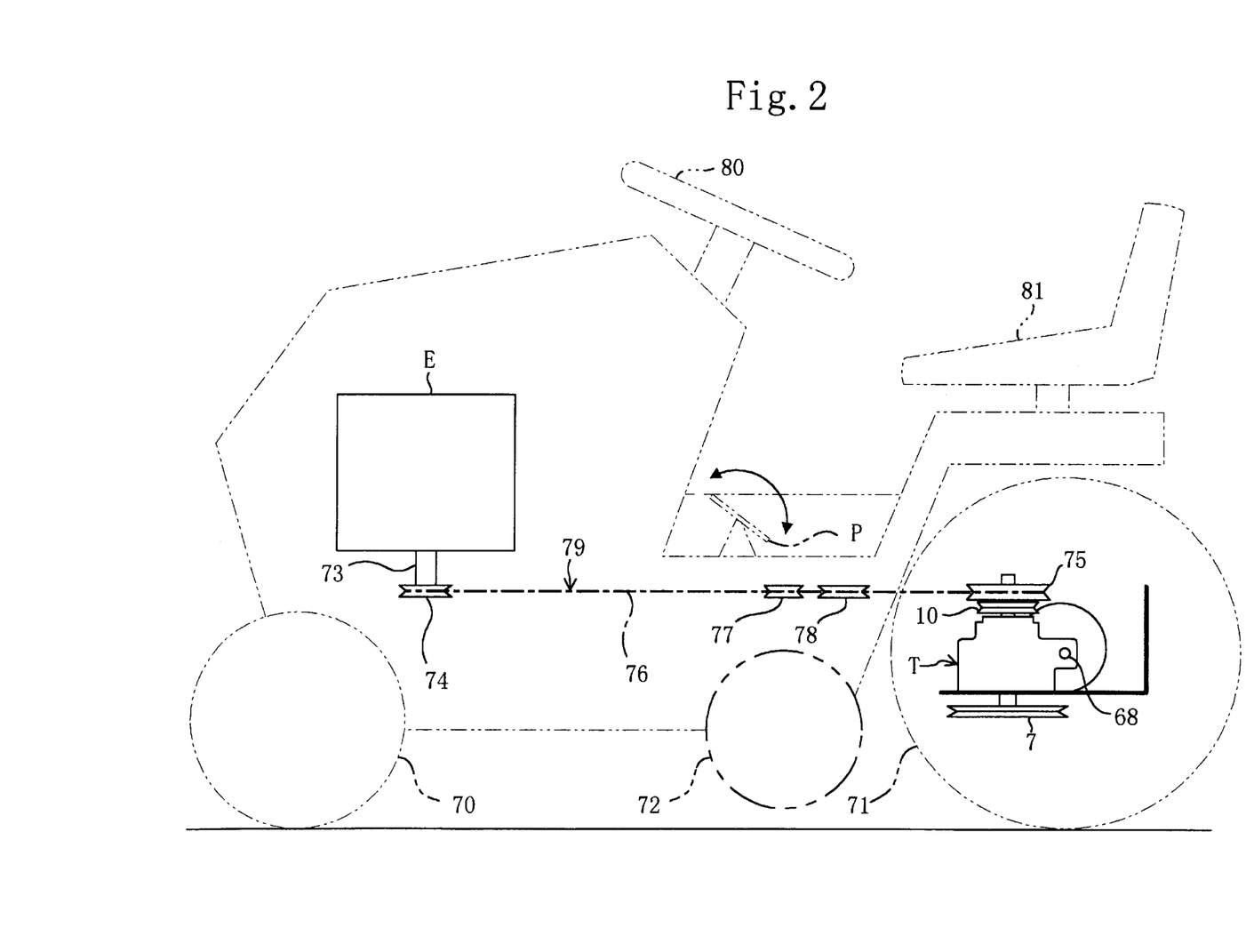
FIG. 2 is a side view schematically showing the entire structure of the continuously variable speed transmission for vehicle according to the embodiment of the present invention.
Figure 3:
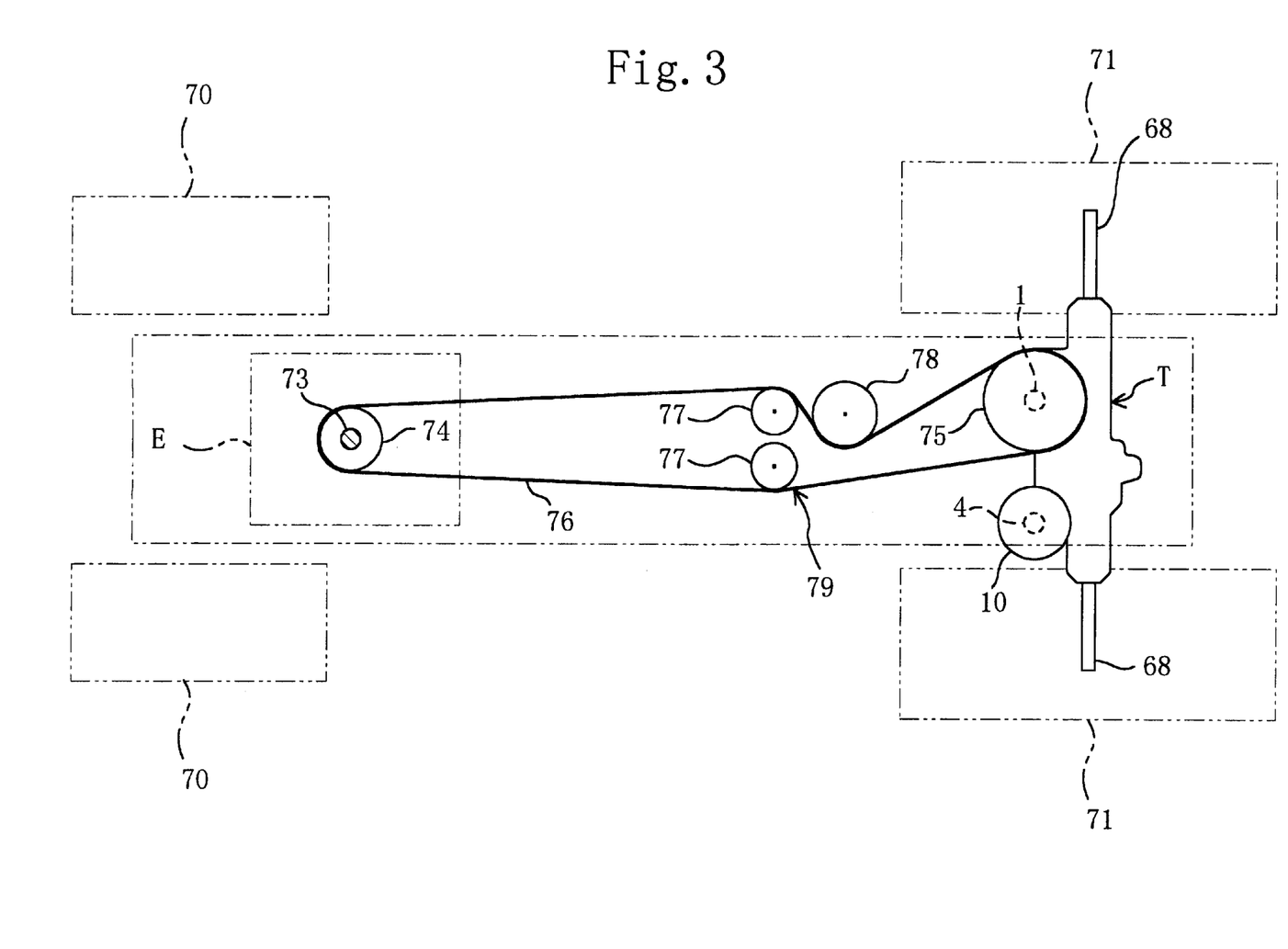
FIG. 3 is a plan view showing a power transmission path between an engine and drive wheels in the mowing tractor.

FIGS. 2 and 3 schematically show the entire structure of a mowing tractor according to an embodiment of the present invention. The tractor is equipped with a vehicle-mounted engine E and a continuously variable speed transmission T provided on the way of a drive train for transmitting a rotatively driving force of the engine E to right and left rear wheels 71, 71 as drive wheels. The engine E is placed on the front side of the tractor body and the continuously variable speed transmission T is placed on the rear side thereof. Through a back-and-forth swinging operation of a foot pedal P disposed at the front side of a driver's seat 81 on the tractor floor, the tractor runs backward and forward. In FIGS. 2 and 3, reference numerals 70, 70 denote right and left front wheels to be steered, a reference numeral 72 denotes a mowing mechanism driven by the engine E, and a reference numeral 80 denotes a steering wheel for steering the front wheels 70, 70.

The continuously variable speed transmission T will be described with reference to FIGS. 1, 4, 5 and 6. In these figures, a reference numeral 1 denotes an input shaft drivingly connected to the vehicle-mounted engine E of the tractor, and a reference numeral 2 denotes a casing for containing gear mechanisms mentioned later of the continuously variable speed transmission T. In the casing 2, a lubricant for lubricating mating parts of the gear mechanisms is stored. The input shaft 1 extends in a perpendicular direction and is placed on a side of the casing 2 located at the right side of the tractor body. At the left side of the tractor body, coaxial first and second rotation shafts 3, 4 are placed in parallel with the input shaft 1 so as to extend in the perpendicular direction. The first rotation shaft 3 is provided with passing through the bottom wall of the casing 2, while the second rotation shaft 4 is provided with passing through the top wall of the casing 2. The top end of the first rotation shaft 3 and the bottom end of the second rotation shaft 4 are vertically and coaxially opposed at a lower part inside the casing 2. At a part of the second rotation shaft 4 close to its bottom end, a cylindrical output shaft 5 having a short axial length is relatively rotatably fitted onto the second rotation shaft 4.

Figure 1:
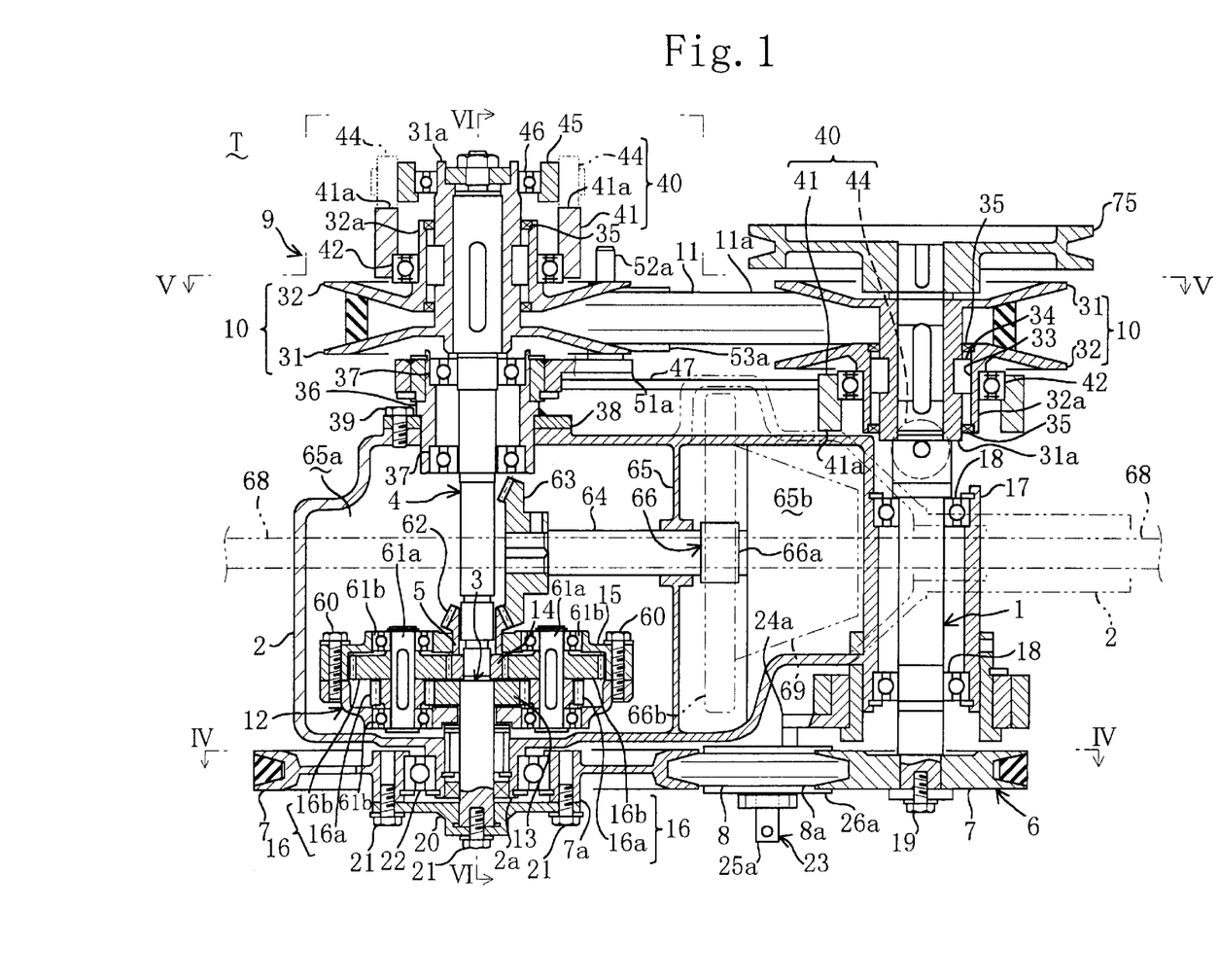
FIG. 1 is a longitudinal cross-sectional view showing the entire structure of a continuously variable speed transmission for vehicle according to an embodiment of the present invention, seen from the rear side of the mowing tractor.

Between the input shaft 1 and the first rotation shaft 3, a belt power transmission mechanism 6 is provided for transmitting power between the input shaft 1 and the first rotation shaft 3 at a constant ratio. The belt power transmission mechanism 6 includes right and left pulleys 7, 7 respectively mounted on the input shaft 1 and the first rotation shaft 3 for unitary rotation and a power transmission belt 8 of a V-belt wound between both the pulleys 7, 7.

On the other hand, between the input shaft 1 and the second rotation shaft 4, a belt variable speed mechanism 9 is provided for transmitting power between the input shaft 1 and the second rotation shaft 4 at a variable ratio. The belt variable speed mechanism 9 includes right and left variable speed pulleys 10, 10 respectively mounted on the input shaft 1 and the second rotation shaft 4 for unitary rotation and a variable speed belt 11 of a V-belt wound between both the variable speed pulleys 10, 10.

Around the output shaft 1, a planetary gear mechanism 12 as a differential gear mechanism is provided. The planetary gear mechanism 12 includes a large-diameter sun gear 13 as a first gear element fixed on the top end part of the first rotation shaft 3 for unitary rotation, a small-diameter sun gear 14 as a second gear element which has a smaller diameter than the large-diameter sun gear 13 and is fixed to the bottom end part of the second rotation shaft 4 for unitary rotation, and a planet carrier 15 which constitutes a third gear element changing its rotational direction and rotation speed with the change in a circumferential speed difference between both the sun gears 13, 14 and holds a plurality of planet gears 16, 16, . . . so as to be rotatable on their respective axes. The output shaft 5 is drivingly connected to the planet carrier 15 for unitary rotation.

The belt power transmission mechanism 6 will be described. The input shaft 1 is rotatably supported, through upper and lower bearings 18, 18, to a sleeve-shaped support 17 formed as a unit with the casing 2 so as to be inserted into the support 17. The right pulley 7 is mounted on the bottom end part of the input shaft 1 through a bolt 19 for unitary rotation. On the other hand, the left pulley 7 with a diameter larger than that of the pulley 7 on the input shaft 1 side is mounted on the bottom end part of the first rotation shaft 3 for unitary rotation. The left pulley 7 has a boss 7a with an inner diameter extensively larger than the outer diameter of the first rotation shaft 3. Between the boss 7a and the first rotation shaft 3, an annular space open toward the casing 2 (upward) is formed. A disc-shaped coupling member 20 is fastened at its circumferential part onto the bottom surface of the boss 7a through bolts 21, 21, and is fastened at its middle part onto the bottom surface of the first rotation shaft 3 through a bolt 21. In this manner, the pulley 7 is fixed to the first rotation shaft 3 for unitary rotation.

Around the periphery of a through hole formed in the bottom wall of the casing 2 for inserting the first rotation shaft 3, a cylindrical part 2a is protrudingly formed as an integral part of the casing 2 so as to extend downward from the bottom surface of the casing 2 and enter the annular space between the first rotation shaft 3 and the boss 7a of the left pulley 7. Between the cylindrical part 2a and the boss 7a of the pulley 7, a bearing 22 is interposed for rotatably supporting the pulley 7 to the cylindrical part 2a. Under this arrangement, the first rotation shaft 3 is rotatably supported to the cylindrical part 2a through the boss 7a of the pulley 7 and the bearing 22.

Further, in the belt power transmission mechanism 6, a power transmission belt tension mechanism 23 is provided for pushing slack-side one of two spans 8a, 8b of the power transmission belt 8 between both the pulleys 7, 7 inward from the outer surface of the belt to give a tension to the power transmission belt 8. The power transmission belt tension mechanism 23 includes first and second tension arms 24a, 24b supported to the bottom end part of the outer periphery of the support 17 of the input shaft 1 so as to be rotatable relative to each other around the input shaft 1. Both the tension arms 24a, 24b are provided at its ends with pendent support shafts 25a, 25b extending in parallel with the input shaft 1, respectively. On the support shafts 25a, 25b, tension pulleys 26a, 26b are rotatably mounted so as to be capable of pushing the opposed spans 8a, 8b from the outer surface side of them, respectively. Between the intermediate parts of the tension arms 24a, 24b, a coil tension spring 27 is arranged. A spring force of the tension spring 27 urges the tension arm 24a on the front side of the tractor body (upper side in FIG. 4) into a counterclockwise rotation of FIG. 4 and urges the tension arm 24b on the rear side (lower side in FIG. 4) into a clockwise rotation, so that both the tension pulleys 26a, 26b push the outer surfaces of the spans 8a, 8b of the power transmission belt 8, respectively.

Figure 4:
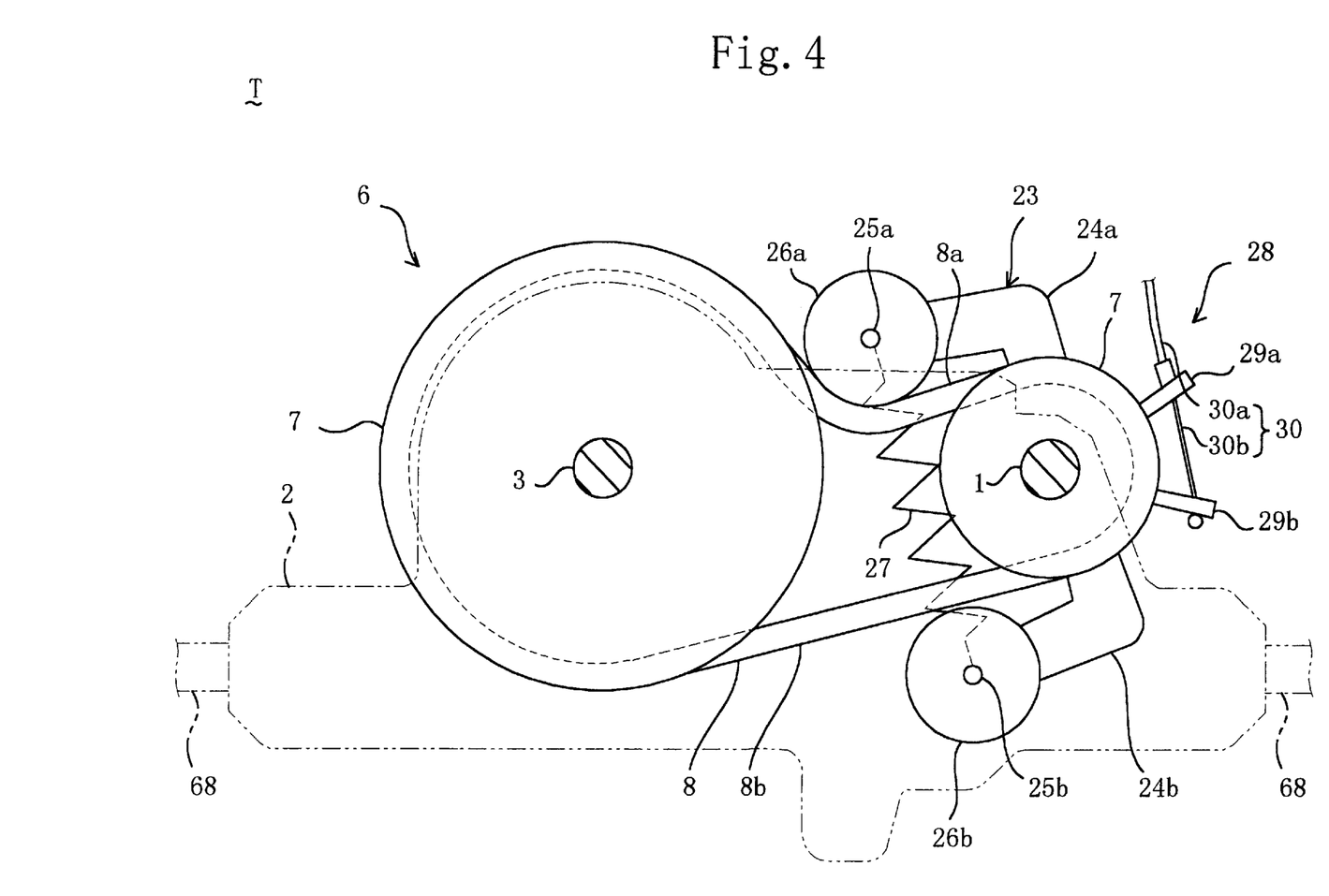
FIG. 4 is a cross-sectional view taken along the line IV—IV of FIG. 1.
Figure 5:
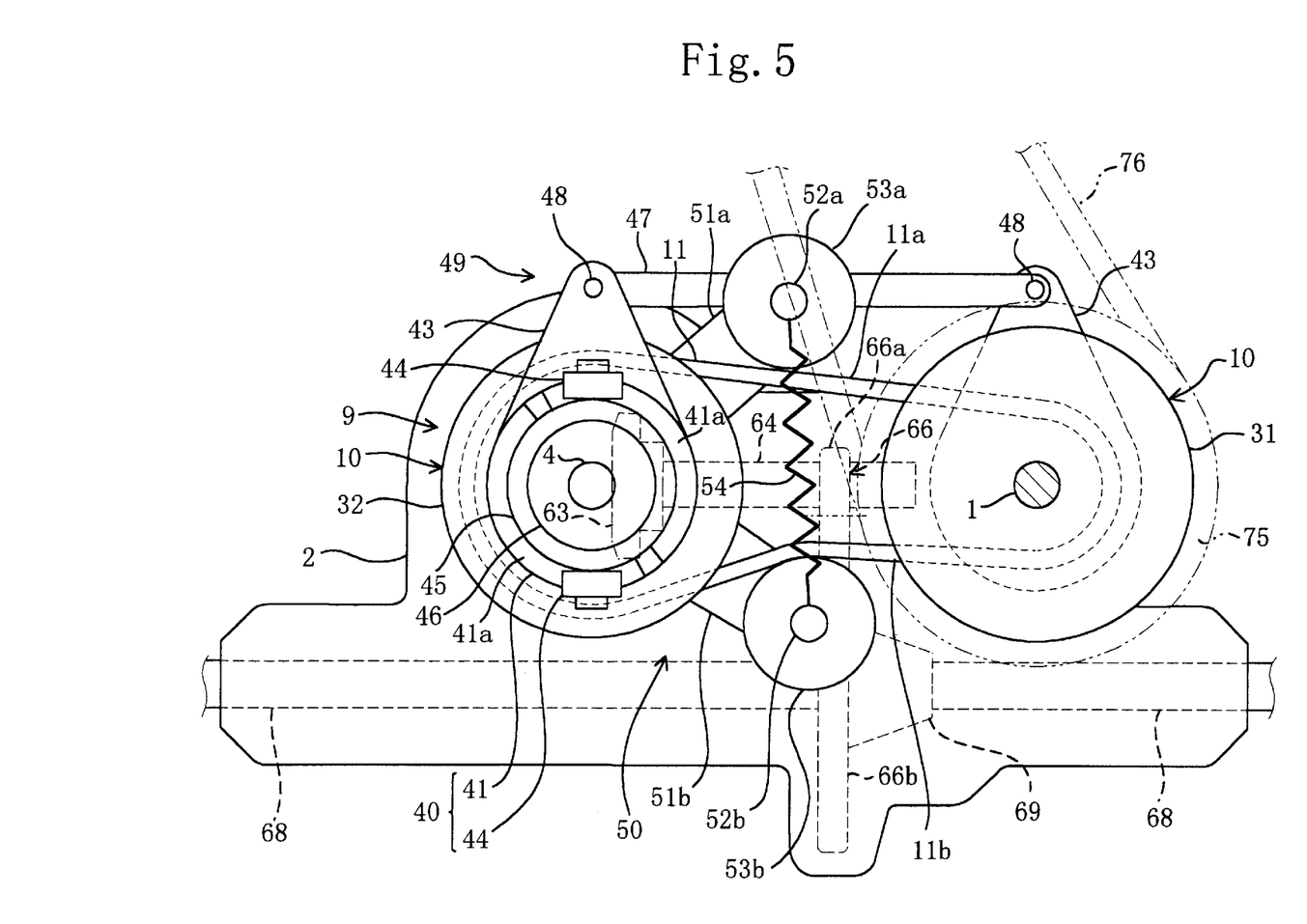
FIG. 5 is a cross-sectional view taken along the line V—V of FIG. 1.

In the power transmission belt tension mechanism 23, an urgent clutch mechanism 28 is provided for rotating both the tension arms 24a, 24b in directions away form each other against the urgence of the tension spring 27. More specifically, at the base ends of the tension arms 24a, 24b, projecting parts 29a, 29b are respectively provided as integral parts of the tension arms 24a, 24b so as to extend radially outward of the first rotation shaft 3. Between the extremities of both the projecting parts 29a, 29b, a control cable 30, routed from an operation unit (not shown) close to the driver's seat 81 of the tractor, is connected. The control cable 30 is formed such that a cable 30b is movably inserted into an outer casing 30a. The extremity of the outer casing 30a is connected to the projecting part 29a on the front side of the tractor body, and the extremity of the cable 30b is connected to the projecting part 29b on the rear side of the tractor body. Through an operation of pulling the cable 30b with respect to the outer casing 30a at the driver's seat 81, the extremities of both the projecting parts 29a, 29b are moved closer to each other so that both the tension arms 24a, 24b are moved away from each other. Thereby, the tension of the power transmission belt 8 is cancelled so that a power transmission through the belt power transmission mechanism 6 is stopped. This causes the tractor to stop running.

Next, the belt variable speed mechanism 9 will be described. The right variable speed pulley 10 on the input shaft 1 side is composed of a fixed sheave 31 supported onto the input shaft 1 for unitary rotation and for no axially sliding movement, and a movable sheave 32 which is supported onto the input shaft 1 at a lower position for unitary rotation and for axially sliding movement and is opposed to the fixed sheave 31 so as to form a belt groove having a V-shaped cross section between the fixed and movable sheaves 31, 32. The fixed sheave 31 has a cylindrical boss 31a extending axially, and the movable sheave 32 has a cylindrical boss 32a extending in the same direction. The boss 32a of the movable sheave 32 is shorter and larger in diameter than the boss 31a of the fixed sheave 31. The movable sheave 32 is fitted at the boss 32a on the boss 31a of the fixed sheave 31. Through the engagement of a key 34 implanted in the outer periphery of the boss 31a of the fixed sheave 31 into a key groove 33 axially formed in the inner periphery of the boss 32a, the movable sheave 32 is supported to the input shaft 1 for unitary rotation and for axially sliding movement. At both opening ends of the boss 32a of the movable sheave 32, sealing members 35, 35 are disposed for forming a seal between the boss 32a and the boss 31a of the fixed sheave 31.

On the second rotation shaft 4, the left variable speed pulley 10 having the same diameter as the variable speed pulley 10 on the input shaft 1 side is provided. The left variable speed pulley 10 has the similar structure as the variable speed pulley 10 on the input shaft 1 side (same parts will be described with reference to same numerals). More specifically, the left variable speed pulley 10 is composed of a fixed sheave 31 supported at a boss 31a thereof onto the second rotation shaft 4 for unitary rotation and for no axially sliding movement, and a movable sheave 32 which is supported at a boss part 32a, through the boss 31a of the fixed sheave 31, to the second rotation shaft 4 for unitary rotation and for axially sliding movement. The left variable speed pulley 10 differs from the variable speed pulley 10 on the input shaft 1 side in that the fixed sheave 31 and the movable sheave 32 are located upside down, i.e., the variable speed pulley 10 on the input shaft 1 side is placed such that the fixed sheave 31 is located above the movable sheave 32, whereas the variable speed pulley 10 on the second rotation shaft 4 side is placed such that the fixed sheave 31 is located below the movable pulley 32. The second rotation shaft 4 is inserted into a sleeve-shaped support member 36 fixed to the top wall of the casing 2 through a through hole formed therein and is rotatably supported to the support member 36 through upper and lower bearings 37, 37. To the outer periphery of the support member 36, a flange-shaped reinforcement 38 is integrally fixed by welding. The reinforcement 38 is fastened, by bolts 39, 39, ..., to a thick part formed at the periphery of the through hole in the top wall of the casing 2.

The movable sheaves 32, 32 of both the variable speed pulleys 10, 10 are individually moved close to or away from the opposed fixed sheaves 31, 31, so that the diameter from the axis of each of the pulleys 10, 10 to the belt wound therearound is changed. For example, when the movable sheave 32 of the variable speed pulley 10 on the input shaft 1 side is moved close to the fixed sheave 31 thereof and the movable sheave 32 of the variable speed pulley 10 on the second rotation shaft 4 side is moved away from the fixed sheave 31 thereof, the diameter from the axis of the variable speed pulley 10 on the input shaft 1 side to the belt wound therearound becomes larger than that from the axis of the variable speed pulley 10 on the second rotation shaft 4 side to the belt wound therearound, so that the rotation of the input shaft 1 is transmitted to the second rotation shaft 4 at an increased rate. On the contrary, when the movable sheave 32 of the variable speed pulley 10 on the input shaft 1 side is moved away from the fixed sheave 31 thereof and the movable sheave 32 of the variable speed pulley 10 on the second rotation shaft 4 side is moved close to the fixed sheave 31 thereof, the diameter from the axis of the variable speed pulley 10 on the input shaft 1 side to the belt wound therearound becomes smaller than that from the axis of the variable speed pulley 10 on the second rotation shaft 4 side to the belt wound therearound, so that the rotation of the input shaft 1 is transmitted to the second rotation shaft 4 at a reduced rate.

On the back side of the movable sheave 32 of each of the variable speed pulleys 10, a cam mechanism 40 is provided for moving the movable sheave 32 close to and away from the fixed sheave 31. The cam mechanism 40 includes a rotary cam 41 mounted onto the boss 32a of the movable sheave 32 through a bearing 42 for relative rotation and for unitary axial movement. In an end surface of the rotary cam 41 opposite to the variable speed pulley 10, a pair of inclined cam surfaces 41a, 41a are formed at same circumferential angular intervals (180° intervals). The rotary cam 41 is provided at its outer periphery with a rotary lever 43 protruding therefrom for unitary rotation. When both the rotary cams 41, 41 rotates in the same direction, the inclined cam surfaces 41a, 41a of the rotary cams 41, 41 are different in a direction of circumferential inclination between the input shaft 1 side and the second rotation shaft 4 side.

On the side of the rotary cam 41 opposite to the variable speed pulley 10, rollers 44, 44 as cam followers in cam contact with the rotary cam 41 are rotatably disposed so as not to travel around and move along the axes of the input shaft 1 and the second rotation shaft 4. More specifically, an annular member 45 is supported onto the boss 31a of the fixed sheave 31 through a bearing 46 so as to be rotatable relative to the fixed sheave 31. The rollers 44, 44 are rotatably mounted at two points of the annular member 45 located on the same diameter of the annular member 45. Further, the annular member 45 is fixedly connected to an unshown fixed body (for example, a tractor body).

The rotary levers 43, 43 of both the cam mechanisms 40, 40 are connected at their extremities through a coupling link 47 for associated operation of both the cam mechanisms 40, 40. Both ends of the coupling link 47 are swingably pivoted to the extremities of the rotary levers 43, 43 by pins 48, 48, respectively. The rotary levers 43, 43, the link 47 and the pins 48, 48 constitute an associated operation mechanism 49. The associated operation mechanism 49 rotates the rotary cams 41, 41 of both the cam mechanisms 40, 40 in association with each other so as to each rotate the rollers 44, 44 on the cam surfaces 41a, 41a, thereby axially moving the movable sheaves 32, 32. Consequently, one of the movable sheaves 32, 32 is moved close to the corresponding fixed sheave 31 but the other movable sheave 32 is moved away from the corresponding fixed sheave 31 so that the effective radiuses of both the pulley grooves, i.e., the diameters from the axes of both the variable speed pulleys 10, 10 to the belt wound therearound, become variable. As a result, the rotational speed ratio between both the variable speed pulleys 10, 10 is changed.

The belt variable speed mechanism 9 is provided with a variable speed belt tension mechanism 50 for pushing slack-side one of both the spans 11a, 11b of the variable speed belt 11 between both the variable speed pulleys 10, 10 inward from the outer surface of the belt to give a tension to the variable speed belt 11. The variable speed belt tension mechanism 50 includes two tension arms 51a, 51b supported, on the back side (lower side) of the fixed sheave 31 of the variable speed pulley 10 on the second rotation shaft 4 side, to the second rotation shaft 4 so as to be rotatable relative to each other around the second rotation shaft 4. To the extremities of the tension arms 51a, 51b, base ends of tension shafts 52a, 52b extending in parallel with the second rotation shaft 4 are fixedly mounted, respectively. The extremities of the tension shafts 52a, 52b are located in the pulley grooves of the variable speed pulleys 10, 10, respectively. Onto the extremities of the tension shafts 52a, 52b, tension pulleys 53a, 53b are rotatably supported so as to allow the push of the spans 11a, 11b of the variable speed belt 11 from their outer surface, respectively. The tension pulleys 53a, 53b are set at positions such that the outer surfaces thereof each come contact with a part of the outer surface of the variable speed belt 11 at any time so as to be capable of pushing it. Further, a coil tension spring 54 is arranged between the intermediate parts of the tension arms 51a, 51b. A spring force of the tension spring 54 urges the tension arm 51a on the front side of the tractor body (upper side in FIG. 5) into a clockwise rotation of FIG. 5 and urges the tension arm 51b on the rear side (lower side in FIG. 5) into a counterclockwise rotation, so that both the tension pulleys 53a, 53b push the outer surfaces of the spans 11a, 11b of the variable speed belt 11, respectively. The rotational urgences of the tension spring 54 to the tension arms 51a, 51b are set such that one of the tension pulleys 53a, 53b pushes the slack-side span 11a, 11b of the variable speed belt 11 at a tension larger than the maximum tension produced in the slack-side span 11a, 11b.

The planetary gear mechanism 12 is arranged in a lower space inside the casing 2. The planetary carrier 15 has a hollow cylindrical form and are formed of upper and lower divided parts. The divided parts are fastened at their outer circumferential parts by bolts 60, 60, . . . into one piece. The lower divided part of the planet carrier 15 is rotatably supported onto the first rotation shaft 3, and the upper divided part of the planet carrier 15 is rotatably supported onto the second rotation shaft 4. Each of the planet gears 16, 16 is rotatably supported into the planet carrier 15 through a shaft 61a and bearings 61b, 61b. The planet gear 16 is composed of a small-diameter pinion 16a and a large-diameter pinion 16b located above the small-diameter pinion 16a and having a diameter larger than that of the small-diameter pinion 16a. The small-diameter pinion 16a is always engaged with the large-diameter sun gear 13 on the first rotation shaft 3, and the large-diameter pinion 16b is always engaged with the small-diameter sun gear 14 on the second rotation shaft 4. Further, the planetary carrier 15 is connected at the inner circumferential part of the upper divided part to the output shaft 5, relatively rotatably supported onto the second rotation shaft 4, for unitary rotation. The output shaft 5 is provided at the top end thereof with a bevel gear 62 formed as an integral part thereof.

Figure 6:
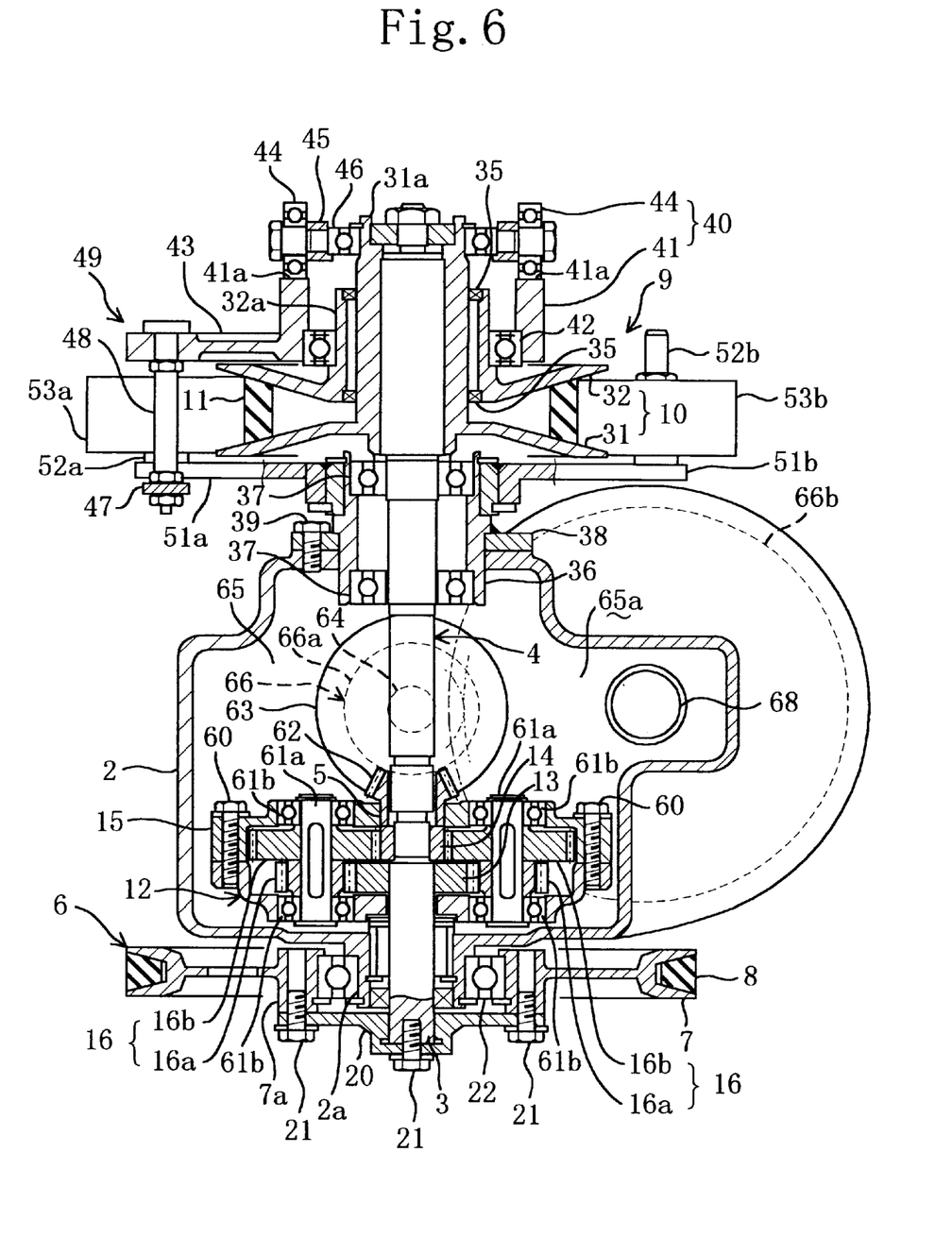
FIG. 6 is a cross-sectional view taken along the line VI—VI of FIG. 1.

In the casing 2, a reduction gear mechanism 66 connected to each of rear wheels (drive wheels) 71 of the tractor through drive shafts 68, 68 is disposed. Each of the drive shafts 68 is previously drivingly connected, at an inner end thereof located close to the middle in the lateral direction of the tractor body, to the reduction gear mechanism 66, and is rotatably supported to the casing 2. Thereby, each of the drive shafts 68 is placed so as to extend in the lateral direction of the tractor body which is a direction approximately orthogonal to the input and output shafts 1, 5 of the transmission T. To the output shaft 5, an auxiliary shaft 64, placed in parallel with the drive shafts 68, 68 so as to extend in the lateral direction of the tractor body, is drivingly connected. More specifically, at an end (left end) of the auxiliary shaft 64 located on the output shaft 5 side, a bevel gear 63 always engaged with the bevel gear 62 of the output shaft 5 is integrally provided. The auxiliary shaft 64 is rotatably supported to a partition 65 for defining the inner space of the casing 2 into a planetary gear room 65a on the left side of the tractor body and a reduction gear room 65b on the right side of the tractor body and passes through the partition 65. The auxiliary shaft 64 is provided at the right end thereof with a small-diameter gear 66a for unitary rotation. On the drive shaft 68 side, a large-diameter gear 66b always engaged with the small-diameter gear 66a is provided for unitary rotation with the drive shafts 68. Both the gears 66a, 66b constitute the reduction gear mechanism 66. Between the right and left drive shafts 68, 68, a differential gear mechanism 69 of a planetary gear mechanism is provided for producing a rotational speed difference between both the rear wheels 71, 71 when the tractor runs around a curve. The large-diameter gear 66b of the reduction gear mechanism 66 is formed integral with the differential gear mechanism 69. In other words, the auxiliary shaft 64 is drivingly connected to the right and left drive shafts 68, 68 (and further the rear wheels 71, 71) through the reduction gear mechanism 66 and the differential gear mechanism 69.

As shown in FIGS. 2 and 3, a power transmission between the continuously variable speed transmission T and the engine E is performed through the belt power transmission mechanism 79. More specifically, the engine E has an output shaft 73 protruding downward. The output shaft 73 is provided at the lower end thereof with a driving-side pulley 74 for unitary rotation. The input shaft 1 of the continuously variable speed transmission T is provided at the upper end thereof with a driven-side pulley 75 for unitary rotation. Between both the pulleys 74, 75, a power transmission belt 76 is entrained. Further, between both the pulleys 74, 75, there are disposed idler pulleys 77, 77 around which the power transmission belt 76 is wound at respective spans thereof and a tension pulley 78 for giving a tension to the slack-side span of the belt.

Accordingly, in the present embodiment, the rotational power of the engine E mounted on the mowing tractor is transmitted to the continuously variable speed transmission T through the belt power transmission mechanism 79, is changed in rotational speed by the continuously variable speed transmission T, and is then transmitted from the output shaft 5 in the casing 2 to the auxiliary shaft 64 and the reduction gear mechanism 66, and from there to the right and left drive shafts 68, 68, and from there to the rear wheels 71, 71. In the continuously variable speed transmission T, the rotational direction and rotational speed of the output shaft 5 are changed so that the tractor moves forward or backward and changes its running speed.

In such a case, in the continuously variable speed transmission T, one of two power transmission paths connecting to the planetary gear mechanism 12 between the input and output shafts 1, 5 is constituted of the belt variable speed mechanism 9, while the other power transmission path is constituted of the belt power transmission mechanism 6. Accordingly, when the distance between the input and output shafts 1, 5 must be changed at the occasion of design change or the like of the transmission T, it is essential only that the casing 2 is changed to different-sized one and the belts 11, 8 of both the mechanisms 9, 6 are changed. This facilitates the change of the center distance.

Further, the continuously variable speed transmission T requires only the casing 12 of the planetary gear mechanism 12 without the need for a large-sized casing as in the case of using the conventional gear mechanism. Accordingly, the continuously variable speed transmission T can be compacted as a whole by a space for the large-sized casing.

Furthermore, both the pulleys 7, 7 and the power transmission belt 8 in the belt power transmission mechanism 6 are disposed on one axial side of the casing 2, i.e., below the casing 2, and both the variable speed pulleys 10, 10 and the variable speed belt 11 in the belt variable speed mechanism 9 are disposed on the other axial side of the casing 2, i.e., above the casing 2. This avoids the maintainabilities of the belt power transmission mechanism 6 and the belt variable speed mechanism 9 from being decreased due to the presence of the casing 2, thereby obtaining good maintainabilities.

Moreover, there is disposed the reduction gear mechanism 66 connected to the rear wheels 71, 71 of the tractor through the drive shafts 68, 68 in the casing 2 of the continuously variable speed transmission T, and the reduction gear mechanism 66 is previously drivingly connected to the output shaft 5 of the transmission T. Accordingly, even when the continuously variable speed transmission T is placed close to the reduction gear mechanism 66 on the tractor rear wheel 71, 71 side, it can be prevented that the continuously variable speed transmission T interferes with the reduction gear mechanism 66 to decrease the maintainabilities of both the belt power transmission mechanism 6 and the belt variable speed mechanism 9.

Further, since the reduction gear mechanism 66 is contained in the casing 2 so as to be closed to the outside, this eliminates the need for a casing designed specifically for the reduction gear mechanism 66. Accordingly, the reduction gear mechanism 66 itself can be compacted by a space for the eliminated casing and the casing 2 can be avoided from being extremely upsized due to the accommodation of the reduction gear mechanism 66.

Furthermore, since the reduction gear mechanism 66 is previously drivingly connected to the output shaft 5, a simple mounting work of the continuously variable speed transmission T on the tractor body doubles as an incorporation of the reduction gear mechanism 66 into the tractor body. This facilitates the assembly work to the tractor body and makes it efficient.

Moreover, each of the drive shafts 68, 68 is previously drivingly connected at an end thereof close to the middle in the lateral direction of the tractor body to the reduction gear mechanism 66 and is rotatably supported to the casing 2. According to this arrangement, at the time when the continuously variable speed transmission T into which the reduction gear mechanism 66 is integrated is mounted on the tractor body, the drive shafts 68, 68 are previously drivingly connected to the reduction gear mechanism 66. In other words, the reduction gear mechanism 66 and the drive train are previously connected to the continuously variable speed transmission T and therefore, a part of the drive train of the tractor located on the drive wheel 71 side is integrated into a unit as a whole. This further facilitates the mounting work of the reduction gear mechanism 66 and the like to the vehicle body and makes it more efficient.

Further, the drive shafts 68, 68 are placed to extend in a direction approximately orthogonal to the input and output shafts 1, 5, the auxiliary shaft 64 extending in parallel with the drive shafts 68, 68 is drivingly connected to the output shaft 5 and the reduction gear mechanism 66 is disposed between the auxiliary shaft 64 and the drive shafts 68, 68. Under this arrangement, the drive shaft 68, 68 can be prevented from interfering with both the pulleys 7, 7 and the power transmission belt 8 in the belt power transmission mechanism 6, placed in a plane orthogonal to the input and output shafts 1, 5, and with both the variable speed pulleys 10, 10 and the variable speed belt 11 in the belt variable speed mechanism 9, similarly, placed in a plane orthogonal to the input and output shafts 1, 5. This avoids decreases in the maintainabilities of the belt power transmission mechanism 6 and the belt variable speed mechanism 9 due to the presence of the drive shafts 68, 68. Further, since each of the drive shafts 68, 68 is parallel with the auxiliary shaft 64, the reduction gear mechanism 66 can readily be provided between both the shafts 68, 64.

Furthermore, a rotatively driving force of the tractor engine E is transmitted to the continuously variable speed transmission T through the belt power transmission mechanism 79. According to this arrangement, in the case where the distance between the engine E and the continuously variable speed transmission T is changed, only a change in the length of the belt 76 of the belt power transmission mechanism 79 is required. Thereby, the response to changes in the distance between the engine E and the continuously variable speed transmission T can be made readily and correctly.

Moreover, the continuously variable speed transmission T is mounted on the tractor body such that both the variable speed pulleys 10, 10 and the variable speed belt 11 in the belt variable speed mechanism 9 are positioned above the casing 2 and both the pulleys 7, 7 and the power transmission belt 8 in the belt power transmission mechanism 6 are positioned below the casing 2. That is to say, the belt variable speed mechanism 9, which has a larger number of elements and movable parts as compared with the belt power transmission mechanism 6 so that its frequency of maintenance such as a checking work and a belt change is higher, is positioned above the casing 2. Accordingly, maintenance of the belt variable speed mechanism 9 can readily be made thereby increasing maintenance efficiency of the continuously variable speed transmission T.

Further, an annular space open toward the casing 2 is formed between the first rotation shaft 3 of the transmission T and the boss 7a of the pulley 7 on the first rotation shaft 3, the casing 2 is provided at the bottom surface thereof with a cylindrical part 2a which protrudes and enters the annular space, and the bearing 22 is interposed between the cylindrical part 2a and the boss 7a of the pulley 7. According to this arrangement, since the cylindrical part 2a of the casing 2 for rotatably supporting the first rotation shaft 3 protrudes toward the pulley 7 fixed on the first rotation shaft 3, this avoids the interference of the cylindrical part with the planetary gear mechanism 12 as caused in the case where the cylindrical part protrudes inside of the casing 2. Further, since the cylindrical part 2a protrudes with entering the annular space between the both 7a of the pulley 7 and the first rotation shaft 3, even when the cylindrical part 2a protrudes outside of the casing 2, the pulley 7 can be kept in a high position, which prevents the interference with the running of the mowing tractor. Accordingly, the first rotation shaft 3 can be supported to the cylindrical part 2a of the casing 2 without increasing the shaft length, and the vertical dimension of the continuously variable speed transmission T can be compacted by the shaft length not to be increased.

Furthermore, since the continuously variable speed transmission T is placed such that the input and output shafts 1, 5 are aligned in the lateral direction of the tractor body, the belt 11 wound between both the variable speed pulleys 10, 10 and the belt 8 wound between both the pulleys 7, 7 can be placed so as to extend in the lateral direction of the tractor body. Accordingly, even on the mowing tractor having a small mounting space in the front-and-rear direction of the body, the continuously variable speed transmission T can be efficiently mounted.

Moreover, since the input and output shafts 1, 5 of the continuously variable speed transmission T can be placed closer to the middle in the front-and-rear direction of the tractor body than the drive shafts 68, 68, the belt power transmission mechanism 6 protruding downward from the casing 2 of the transmission T can be moved closer to the middle in the front-and-rear direction of the tractor body than the drive shafts 68, 68. This avoids the overhang angle of the mowing tractor from decreasing due to the presence of the belt power transmission mechanism 6.

In the above embodiment, the continuously variable speed transmission T is placed such that the input and output shafts 1, 5 are aligned in the lateral direction of the tractor body. However, the continuously variable speed transmission T can be placed such that the input and output shafts 1, 5 are aligned in the front-and-rear direction of the tractor body. According to this arrangement, since both the variable speed pulleys 10, 10 and both the pulleys 7, 7 of the continuously variable speed transmission T are aligned in the front-and-rear direction of the tractor body, the belt 11 wound between both the variable speed pulleys 10, 10 and the belt 8 wound between both the pulleys 7, 7 can be placed so as to extend in the front-and-rear direction of the tractor body. Thereby, the dimension of the continuously variable speed transmission T in the lateral direction of the tractor body can be made smaller than that in the front-and-rear direction of the tractor body. Accordingly, even on the mowing tractor having a small mounting space in the lateral direction of the tractor body, the continuously variable speed transmission T can be efficiently mounted.

It is matter of course that the continuously variable speed transmission T of the present invention can be also applied to various types of vehicles other than the mowing tractor.

INDUSTRIAL APPLICABILITY

Since the continuously variable speed transmission T of the present invention is designed such that the differential gear mechanism is contained in the casing and the belt variable speed mechanism and the belt power transmission mechanism are disposed outside of the casing, maintenance such as a belt inspection and a belt change in the belt variable speed mechanism and the belt power transmission mechanism can be made with great facility. Accordingly, the present invention has a high industrial applicability in that use of a mowing tractor having an excellent practicality can be promoted.

What is claimed is:

1. A continuously variable speed transmission for vehicle comprising:

an input shaft drivingly connected to a vehicle-mounted engine;

a first rotation shaft placed in parallel with the input shaft;

a power transmission mechanism, provided between the input shaft and the first rotation shaft, for transmitting power between the input shaft and the first rotation shaft at a constant ratio;

a second rotation shaft placed coaxially with the first rotation shaft;

a belt variable speed mechanism, including two variable speed pulleys with a variable pulley diameter respectively provided on the input shaft and the second rotation shaft for unitary rotation and a variable speed belt wound between both the variable speed pulleys, for transmitting power between the input shaft and the second rotation shaft at a variable ratio;

a differential gear mechanism which includes a first gear element connected to the first rotation shaft, a second gear element connected to the second rotation shaft and a third gear element changing its rotational direction and rotational speed with the change in the circumferential speed difference between the first and second gear elements and is enclosed in a casing; and an output shaft coaxially placed with the first and second rotation shafts and drivingly connected to the third gear element, wherein the power transmission mechanism is formed of a belt power transmission mechanism including two pulleys respectively provided on the input shaft and the first rotation shaft for unitary rotation and a power transmission belt wound around both the pulleys, both the pulleys and the power transmission belt of the belt power transmission mechanism are placed in a plane parallel with a plane in which both the variable speed pulleys and the variable speed belt of the belt variable speed mechanism are provided, and the casing is placed between the belt power transmission mechanism and the belt variable speed mechanism.

2. The continuously variable speed transmission for vehicle of claim 1, wherein a reduction gear mechanism connected to each of drive wheels of a vehicle through respective drive shafts is disposed in the casing and the reduction gear mechanism is drivingly connected to the output shaft.

3. The continuously variable speed transmission for vehicle of claim 2, wherein each of the drive shafts is drivingly connected at one end thereof to the reduction gear mechanism and is rotatably supported to the casing.

4. The continuously variable speed transmission for vehicle of claim 3, wherein the drive shaft is placed to extend in a direction approximately orthogonal to the input and output shafts, an auxiliary shaft disposed to extend in parallel with the drive shaft is drivingly connected to the output shaft, and the reduction gear mechanism is provided between the auxiliary shaft and the drive shaft.

5. A mowing tractor provided with the continuously variable speed transmission of any one of claims 1 to 4, wherein a rotatively driving force of an engine is transmitted to each of the drive wheels through the continuously variable speed transmission.

6. The mowing tractor of claim 5, comprising a belt power transmission mechanism for transmitting the rotatively driving force of the engine to the continuously variable speed transmission.

7. The mowing tractor of claim 5, wherein the continuously variable speed transmission is placed such that both the variable speed pulleys and the variable speed belt in the belt variable speed mechanism are positioned above the casing and both the pulleys and the power transmission belt in the belt power transmission mechanism are positioned below the casing.

8. The mowing tractor of claim 7, wherein an annular space open toward the casing is formed between the first rotation shaft and a boss of the pulley on the first rotation shaft, the casing is provided with a cylindrical part which protrudes around a through hole for the insertion of the first rotation shaft and enters the annular space, and a bearing for rotatably supporting the pulley to the cylindrical part is interposed between the cylindrical part and the boss of the pulley, and the first rotation shaft is rotatably supported to the cylindrical part through the boss of the pulley and the bearing.

9. The mowing tractor of claim 7, wherein the continuously variable speed transmission is placed such that the input and output shafts are aligned in a lateral direction of the tractor body.

10. The mowing tractor of claim 9, wherein the input and output shafts of the continuously variable speed transmission are placed closer to the middle in the front-and-rear direction of the tractor body than the drive shaft.

11. The mowing tractor of claim 7, wherein the continuously variable speed transmission is placed such that the input and output shafts are aligned in the front-and-rear direction of the tractor body.

12. The mowing tractor of claim 6, wherein the continuously variable speed transmission is placed such that both the variable speed pulleys and the variable speed belt in the belt variable speed mechanism are positioned above the casing and both the pulleys and the power transmission belt in the belt power transmission mechanism are positioned below the casing.

13. The mowing tractor of claim 12, wherein an annular space open toward the casing is formed between the first rotation shaft and a boss of the pulley on the first rotation shaft, the casing is provided with a cylindrical part which protrudes around a through hole for the insertion of the first rotation shaft and enters the annular space, and a bearing for rotatably supporting the pulley to the cylindrical part is interposed between the cylindrical part and the boss of the pulley, and the first rotation shaft is rotatably supported to the cylindrical part through the boss of the pulley and the bearing.

14. The mowing tractor of claim 13, wherein the continuously variable speed transmission is placed such that the input and output shafts are aligned in a lateral direction of the tractor body.

15. The mowing tractor of claim 14, wherein the input and output shafts of the continuously variable speed transmission are placed closer to the middle in the front-and-rear direction of the tractor body than the drive shaft.

16. The mowing tractor of claim 13, wherein the continuously variable speed transmission is placed such that the input and output shafts are aligned in the front-and-rear direction of the tractor body.

17. The mowing tractor of claim 12, wherein the continuously variable speed transmission is placed such that the input and output shafts are aligned in a lateral direction of the tractor body.

18. The mowing tractor of claim 17, wherein the input and output shafts of the continuously variable speed transmission are placed closer to the middle in the front-and-rear direction of the tractor body than the drive shaft.

19. The mowing tractor of claim 12, wherein the continuously variable speed transmission is placed such that the input and output shafts are aligned in the front-and-rear direction of the tractor body.

20. The mowing tractor of claim 8, wherein the continuously variable speed transmission is placed such that the input and output shafts are aligned in a lateral direction of the tractor body.

21. The mowing tractor of claim 20, wherein the input and output shafts of the continuously variable speed transmission are placed closer to the middle in the front-and-rear direction of the tractor body than the drive shaft.

22. The mowing tractor of claim 8, wherein the continuously variable speed transmission is placed such that the input and output shafts are aligned in the front-and-rear direction of the tractor body.

* * * * *